US005355571A

United States Patent [19]

Miche

[11] Patent Number: 5,355,571

[45] Date of Patent: Oct. 18, 1994

[54] METHOD FOR OPENING A WATCH CASE AND APPARATUS FOR PRACTICING SUCH METHOD

[75] Inventor: Marc-André Miche, Bienne, Switzerland

[73] Assignee: SMH Management Services AG, Biel, Switzerland

[21] Appl. No.: 24,455

[22] Filed: Mar. 1, 1993

[30] Foreign Application Priority Data

Mar. 9, 1992 [CH] Switzerland ........................ 00739/92

[51] Int. Cl.$^5$ .......................... G04D 3/00; B23P 19/00

[52] U.S. Cl. .......................................... 29/179; 29/807

[58] Field of Search .................................. 29/807, 179

[56] References Cited

U.S. PATENT DOCUMENTS

| | | | |
|---|---|---|---|
| 1,176,353 | 3/1916 | Dover | 29/807 |
| 2,595,172 | 4/1952 | Schenke | 29/807 |
| 3,074,156 | 1/1963 | Hinrichsen et al. | 29/807 |
| 3,445,913 | 5/1969 | Piquerez | 29/807 |

FOREIGN PATENT DOCUMENTS

| | | |
|---|---|---|
| 1128420 | 2/1955 | France . |
| 1551479 | 1/1968 | France . |
| 376437 | 3/1963 | Switzerland . |
| 541181 | 3/1964 | Switzerland . |

*Primary Examiner*—P. W. Echols

*Attorney, Agent, or Firm*—Griffin Butler Whisenhunt & Kurtossy

[57] ABSTRACT

In order to open the watch case (1) by extraction of the crystal (2) such case is secured in an enclosure (3) after its stem and crown have been removed. Next, a suction cup (4) is applied to the crystal, such suction cup being maneuverable from outside the enclosure by means of a handle (40). By means of a pump controlled by a lever (37) the enclosure is subjected to a predetermined overpressure, following which a pulling force (A) is exerted on the suction cup until extraction of the crystal. The overpressure being the same at both the exterior and interior of the case, no displacement of air is brought about and hence no damage to the watch mechanism when the crystal is separated from the case.

7 Claims, 4 Drawing Sheets

METHOD FOR OPENING A WATCH CASE AND APPARATUS FOR PRACTICING SUCH METHOD

The present invention relates to a method for opening a watch case by extraction of the crystal.

BACKGROUND OF THE INVENTION

When a watch case includes a caseband integrally formed with the back cover during manufacture, the fitting of the movement can only take place through the top of the caseband, after which the crystal is put into place in a sealed manner, for example by means of a packing interposed between the edge of the crystal and the interior edge of the caseband or the bezel. This manner of proceeding is generally reserved for mineral glass or sapphire crystals. If it is necessary to repair the movement, there are no means other than those of extracting the crystal from its seat, after which the movement may be removed from the case.

If the crystal projects from the caseband, it would be possible to employ a tool exhibiting a multitude of jaws capable of rocking through the action of levers, as is described for example in the patent document U.S. Pat. No. 3,074,156. It is certain however that such tool damages the periphery of the crystal and leaves scratches thereon, requiring recourse to a new crystal. The tool mentioned hereinabove is specific to removal of synthetic crystals.

In the case where the upper face of the crystal is at the same level as the caseband, which is the case with mineral glass and sapphire crystals or in the case in which the use of pliers is undesirable, one then has recourse to an extraction method for the crystal by driving it out under pressure as is described for example in the patent document CH-A-376 437. This method requires that the pressure prevailing within the case is increased until the crystal comes out of its housing. In order to proceed, the first portion of the broken type winding stem with which the movement is generally equipped is extracted and recess to the inlet thus created, an output duct for a pump is connected which permits increasing the pressure in the interior of the case up to the point where the crystal is driven out of its housing. Such a pump is described in patent document CH-A-541 181. However, since pressure on the order of 3 to 4 bars is necessary in order to extract the crystal, it will be understood that at the moment when such crystal is expelled from its seat, there occurs a violent displacement of air within the case, even if care has been taken to proportion the pump capacity to the volume of the case to be opened. According to the design of the watch, such air displacement may cause damage to certain interior elements of the watch. There has been seen for example dials and hands buckled, balance springs put out of adjustment, calendar discs bent or even bearings emptied of their oil.

SUMMARY OF THE INVENTION

To overcome the cited difficulties, the method according to the invention is characterized by the fact that it includes the series of steps as follows: the case is secured in an enclosure, a suction cup applied to the crystal, the interior of the enclosure as well as the interior of the case subjected to the same predetermined overpressure, a traction force is exerted on the suction cup until extraction of the crystal, and normal pressure is reestablished in the enclosure in order to remove the case relieved of its crystal.

In order to practice the method of the invention, there is proposed an apparatus characterized in that it includes a stand in which a pump is housed, an enclosure surmounting the stand and in which opens out a duct communicating with the pump, the enclosure including an arrangement for securing the watch case, said enclosure being surmounted by a detachable cover blocking its upper portion, said cover being provided with a valve and a stem, such latter being slidingly fitted through the cover and bearing, at its end located within the enclosure, a suction cup capable of being applied against the crystal to be extracted from the case.

The invention will be now understood with the help of the following description and the drawings which illustrate it.

DESCRIPTION OF THE PREFERRED EMBODIMENTS

Figure 1:
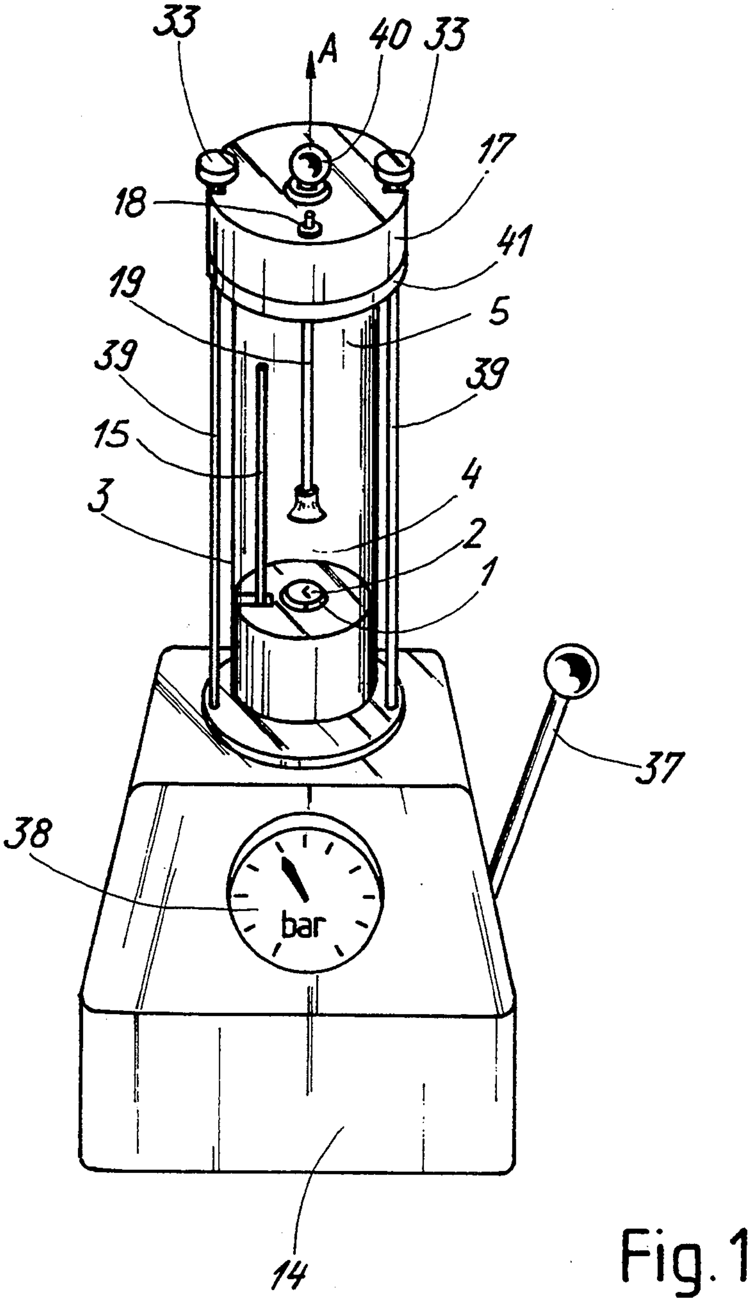
FIG. 1 a perspective view of an example of the apparatus used for practicing the method according to the invention.

Reference will be made to FIG. 1 in order to explain the method of the invention. The watch case 1 is secured in an enclosure 3. Onto the crystal of the watch is applied a suction cup 4. Next, the interior 5 of the enclosure and the interior of the watch are subjected to the same predetermined overpressure which will have as its effect to apply the suction cup onto the crystal with a force proportional to the overpressure prevailing within the enclosure. Finally, a traction force A is exerted on the suction cup until extraction of the crystal. Once the crystal is separated from the case, the normal pressure (atmospheric pressure) is reestablished in the enclosure which permits removing the case from the enclosure, such case then being relieved of its crystal.

The principle of the method having been explained, reference will be made more specifically to FIGS. 1 and 2 in order to describe a specific apparatus enabling putting into practice such method.

The apparatus includes a stand 14 in which is located a pump (not shown), such pump being operated by a lever 37. A cylindrical enclosure 3 surmounts the stand 14 to which it is secured by means of two tie rods 39. Such enclosure is shown in the form of a transparent tube into which opens out a duct 15 which communicates with the pump. The upper portion 41 of the enclosure 3 is blocked by a detachable cover 17. Such cover is secured to the enclosure by means of two knobs 33. Sealing between the upper portion 41 of the enclosure and cover 17 is assured by an O-ring seal 31. Cover 17 is provided with a valve 18 in order to allow the air in overpressure to escape when its stem is pressed. Finally, the cover is traversed by a stem 19 slidingly fitted at the center of the cover, another O-ring seal 32 assuring sealing of the stem. One end of the stem 19 is provided with an operating handle 40, while the other end, that located within the enclosure, is equipped with a suction cup 4 capable of being applied against the crystal 2 which is to be extracted from the watch case 1.

In order to remove crystal 2, it is, as is well understood, indispensable to secure the case rigidly within the enclosure 3. Securing means 16 may be very varied and one embodiment is shown in detail on FIG. 2. The arrangement 16 includes initially a cylindrical block 27 exhibiting a channel 35 in order to allow passage of duct 15 and four threaded rods 30 screwed into block 27 and extending up to the cover 17. On such block 27 the case 1 is placed with its back cover against the block. The arrangement 16 further includes a ring 28, the central opening 36 of which exhibits a diameter slightly greater than the diameter of the crystal 2. Such ring also comprises a channel 34 in order to allow passage of the duct 15 and four holes which permit stringing the ring on the threaded rods 30. The ring is slid until it bears against case 1, then four knurled knobs 29 screwed on rods 30 are tightened. This assembly 16 is next introduced into enclosure 3. Then cover 17 is applied with its stem 19 and its suction cup 4 onto the enclosure and the knobs 33 are blocked. The suction cup is crushed against the crystal in causing the stem 19 to be lowered within the enclosure. As soon as one senses good application of the suction cup, one begins to increase pressure in the enclosure 3 in imparting back and forth movements to lever 37 which operates the pump. When the overpressure has attained a sufficient value which may be checked by manometer 38, a traction force is exerted in the sense of arrow A on handle 40 of stem 19 continuing until the crystal yields. When the crystal has yielded, normal pressure is reestablished in the enclosure by pressing on valve 18 and thereafter the cover 17 may be freed as well as the case 1 with its retainer 16.

It has already been said that in order to avoid all displacement of air—and consequently any damage to the parts located within the watch—at the moment of extraction of the crystal, the invention provides subjecting the interior just as the exterior of the case to a same overpressure. This presupposes that the interior space of the case is connected to its exterior space. One may bring about such communication by various means.

Figure 3:
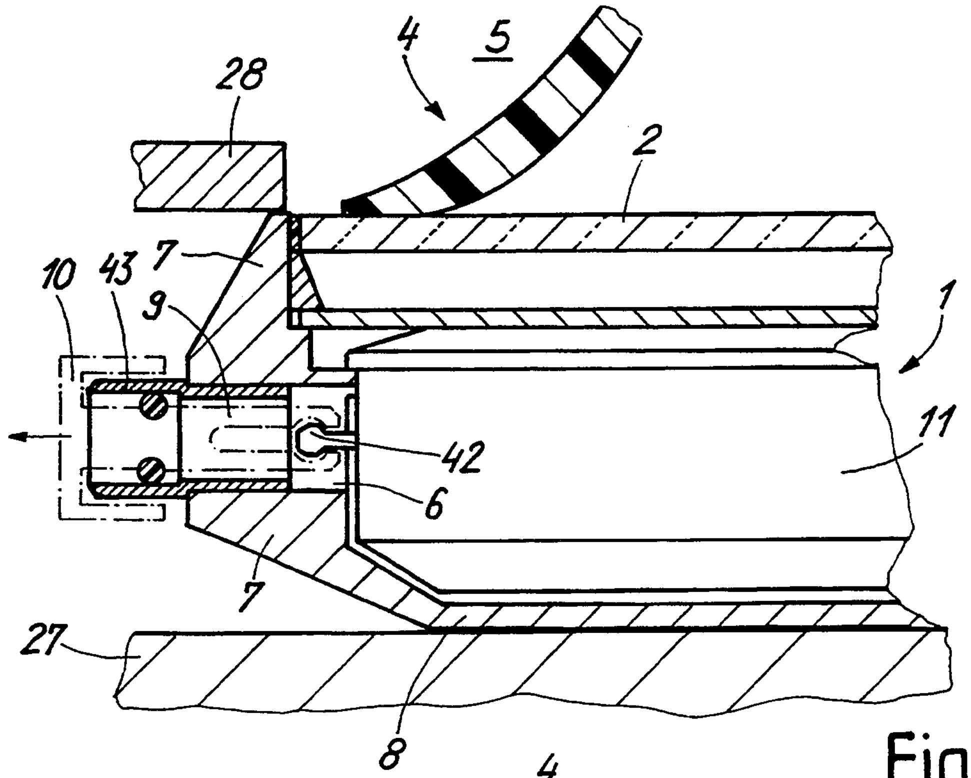
FIG. 3 is a cross-section of a watch case exhibiting a caseband integrally formed with a back cover.

FIG. 3 shows a case 1 having a caseband 7 integrally formed with the back cover 8. In this design it is necessary to extract the stem in order to create communication between the two spaces. FIG. 3 shows that the movement 11 includes a crown 10 with broken stem 9 which may be separated from the portion 42 reaching the movement. When the crown and stem have been removed, the interior space 6 will be connected by tube 43 to the exterior space 5 extending in the enclosure 3. The back cover 8 is placed on block 27 and the caseband 7 is retained by ring 28. Suction cup 4 is applied onto crystal 2, then the pressure is increased in the enclosure until a predetermined value has been attained, after which one may exert a traction force on the suction cup in order to extract the crystal.

Figure 4:
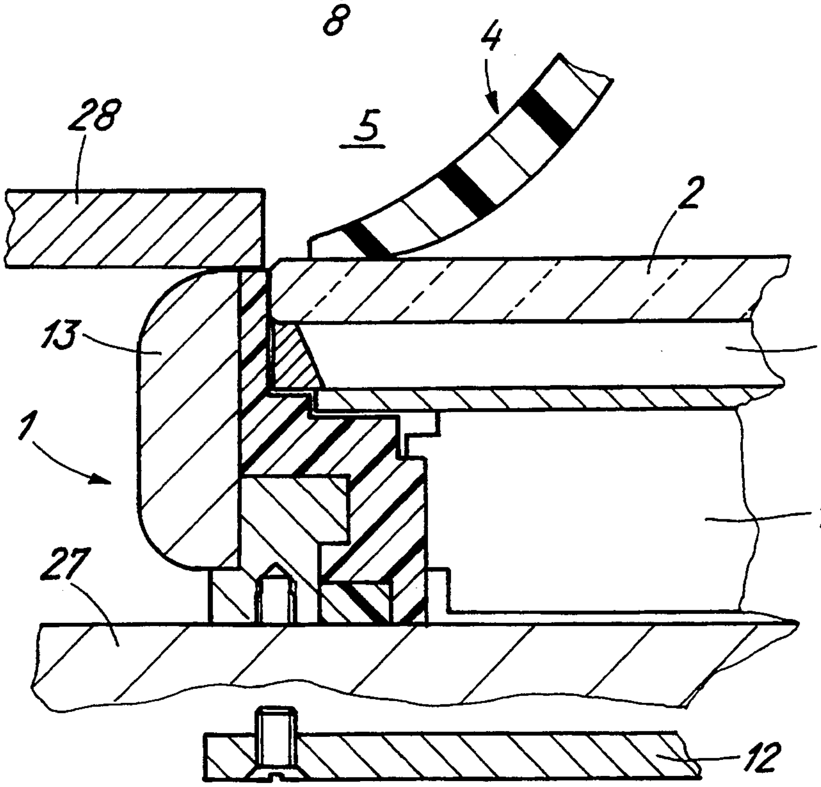
FIG. 4 is a cross-section of a watch case drawn with the back cover removed and in which the movement is accessible only after extraction of the crystal.

FIG. 4 shows a case 1 which includes a back cover 12 distinct from the caseband 13, but wherein movement 11 may not be removed from the caseband, except from above. In this case one can, prior to placing the case in enclosure 3, remove the back cover 12 and set the case relieved of its back cover on block 27. There will then be communication between the interior space 6 and space 5 of enclosure 3. In the same manner, the case is retained by ring 28, then the suction cup 4 is applied onto face 2. Thereafter, one proceeds as explained hereinabove.

In situations where one has to do with an electronic watch, there is often to be found a battery receptacle closed by a cover and formed in the back cover of the watch. In such situation it is sufficient to remove such cover in order to create the desired communication.

Figure 2:
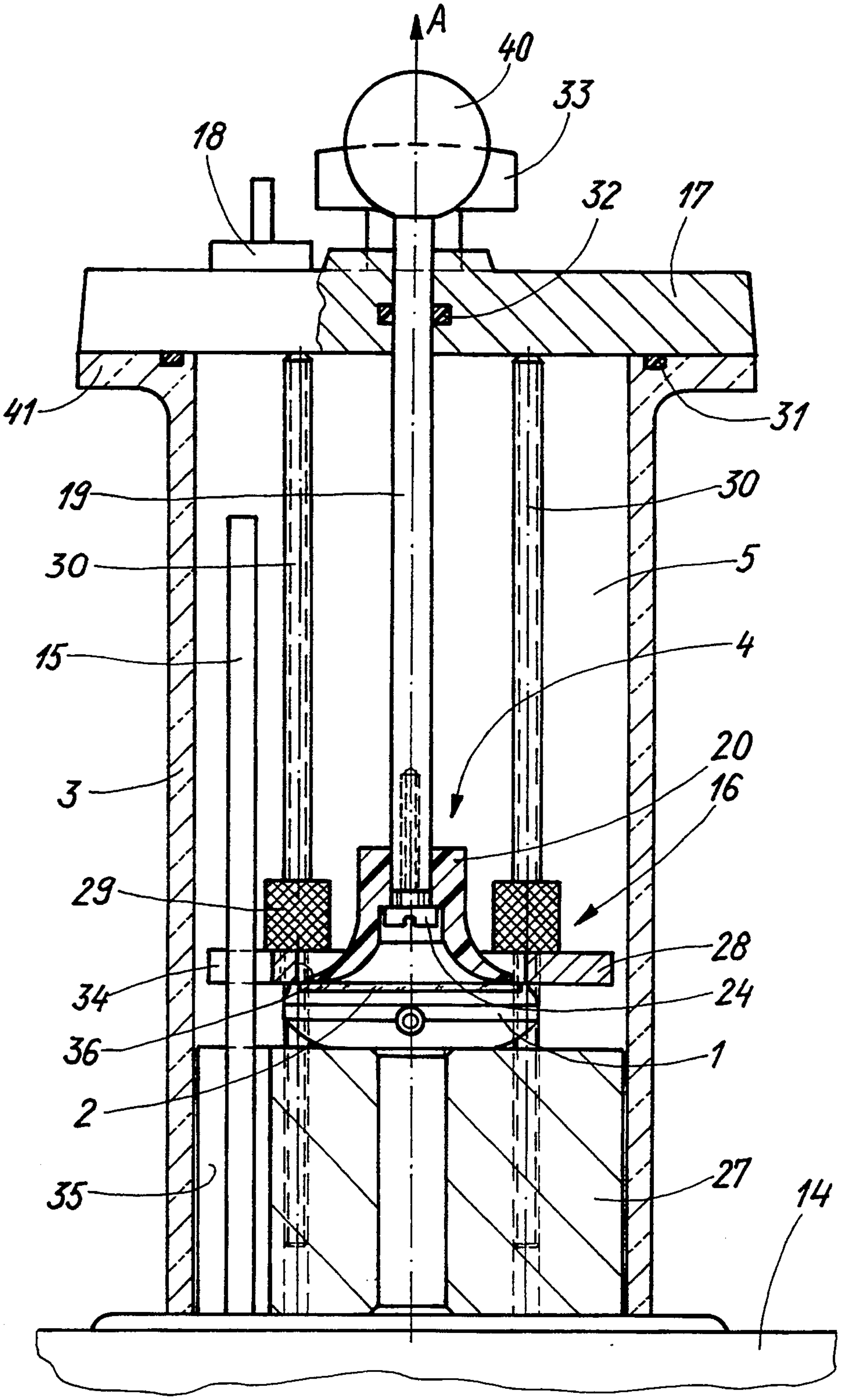
FIG. 2 s a cross-section in a portion of the apparatus shown on FIG. 1, such cross-section exhibiting a suction cup according to a first embodiment.

The first suction cup 4 which comes to mind in order to remove the crystal is the conical suction cup 30 shown on FIG. 2. Such suction cup is retained on the end of stem 19 by means of screw 24. As this type of suction cup on the one hand is difficult to attach rigidly onto stem 19 and on the other hand often appears in material of mediocre quality, preference will be given to the use of the suction cup shown in detail on FIG. 5.

Figure 5:
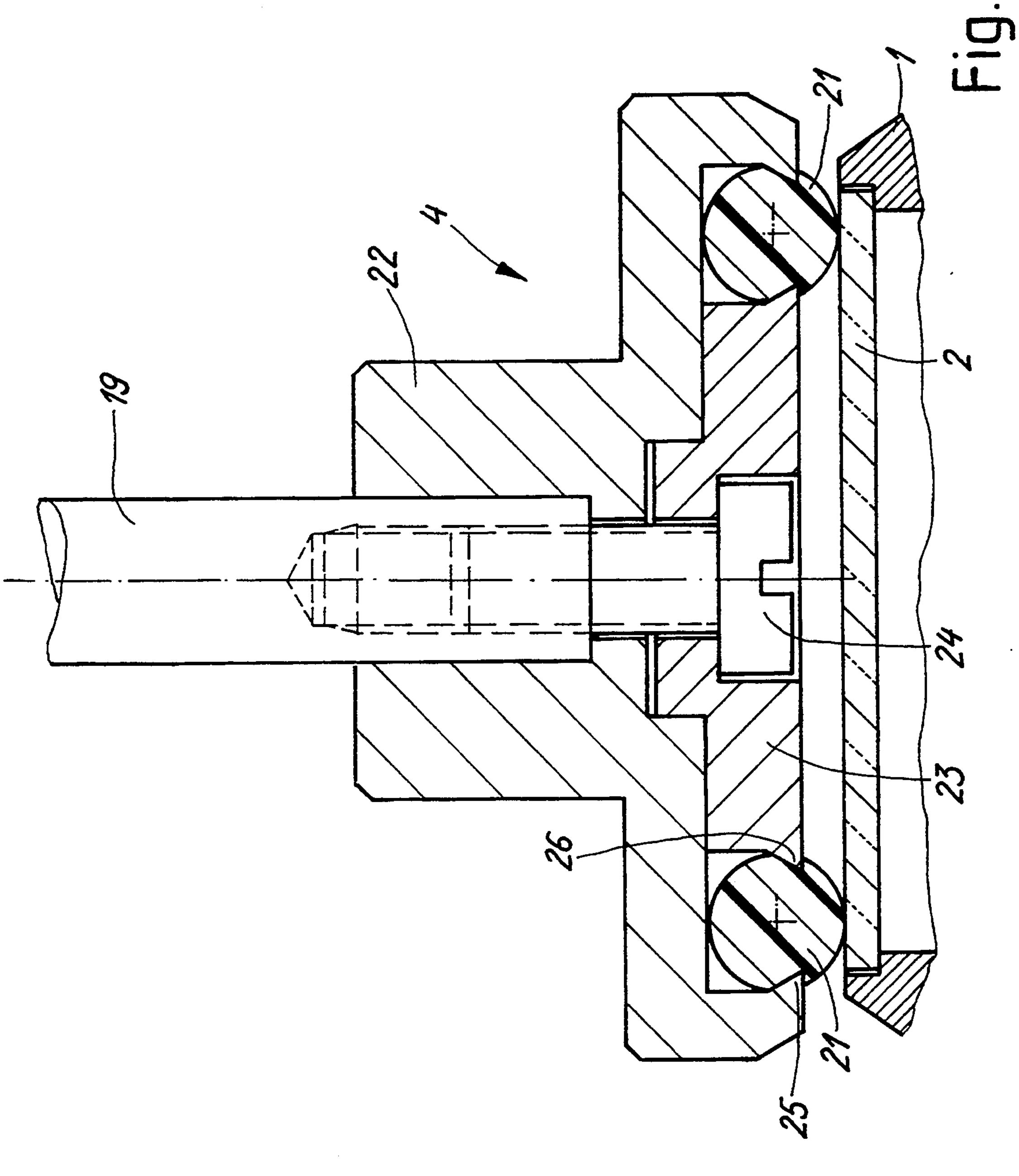
FIG. 5 shows another embodiment of the suction cup equipping the apparatus presented in FIG. 2.

The suction cup of FIG. 5, of better technical design, includes basically an O-ring 21 which is applied against the crystal 2 to be extracted. The O-ring 21 is confined between two circular elements 22 and 23 and retained by circular claws 25 and 26. Elements 22 and 23 are secured to stem 19 by means of a screw 24. The O-ring 21 may be of a quality carefully regulated and is rigidly anchored to stem 19. Hardness on the order of 70 Shore magnitude for the O-ring gives good results.

The overpressure to have prevailing within the interior 5 of the enclosure 3 will depend on the one hand on the diameter of the suction cup conditioned by the diameter of the crystal and, on the other hand, on the retaining force of the crystal in its seat. It has been determined that an overpressure capable of adjustment between two and six bars answers to all needs which show up in practice, taking into account the fact that the retaining force of the crystal in its seat is in all cases greater than 50 Newtons (N). If P is the overpressure in bars and R the outer radius of the suction cup in mm, the extraction force F in Newtons will be written:

$$F(N)=\pi \cdot r^2(mm^2) \cdot 10^{-1} \cdot P(bar$$

In the case of an overpressure of 4 bars and a diameter of 15 mm for the suction cup, the extraction force will be 70.7 N. By increasing the overpressure to 6 bars, the extraction force will be 106 N. With atmospheric pressure of 1 bar and with the same suction cup of 15 mm, the extraction force is only 17.6 N which force will be insufficient to remove the crystal from its housing.

According to the anchoring force of the crystal in its seat, it may happen that it is necessary to exert a considerable force on the handle 40 of stem 19. In order to facilitate manoeuvring of the stem, it is understood that one may add thereto a rack system and lever arm on which the force to be exerted remains reasonable.

The apparatus shown in perspective on FIG. 1 is identical to the apparatus Nr. 5555 provided by the Company Bergeon & Cie SA, CH-2400 Le Locle, except insofar as concerns the retainer 16 and suction cup 4 which have been added thereto. Apparatus Nr. 5555 is employed for checking the water tightness of watches. It is seen that in providing it with a removable mounting 16 and a new cover 17 equipped with a suction cup 4, the basic apparatus may be profitably employed to fulfil a new function, the original function being capable of being rapidly reestablished if necessary.

What I claim is:

1. A method for opening a watch case by extraction of the crystal including the following steps:

the watch case is secured in an enclosure, a suction cup is applied to the crystal, the interior of the enclosure as well as the interior of the watch case are subjected to the same predetermined overpressure, a pulling force is exerted on the suction cup until extraction of the crystal, normal pressure is reestablished within the enclosure in order to remove the watchcase relieved of its crystal.

2. A method as set forth in claim 1 wherein the overpressure may be adjusted between two and six bars.

3. A method as set forth in claim 1 in which, if the watch case includes a caseband integrally formed with the back cover, the stem and the crown exhibited by the movement are removed prior to exerting the overpressure in the enclosure.

4. A method as set forth in claim 1 in which , if the watch case includes a back cover distinct from the caseband, the back cover is removed prior to exerting the overpressure in the enclosure.

5. An apparatus for opening a watch case by extraction of a crystal, said apparatus including a stand in which a pump is housed, an enclosure surmounting the stand and into which a duct communicating with the pump opens out, the enclosure including a securing arrangement for the watch case, said enclosure being surmounted by a detachable cover blocking an upper portion of said enclosure, said cover being provided with a valve and a stem, said stem being slidingly mounted through the cover and, at a stem end within the enclosure, bearing a suction cup capable of being applied against the crystal to be extracted from the case.

6. An apparatus as set forth in claim 5 wherein the suction cup exhibits substantially the form of a cone.

7. An apparatus as set forth in claim 5 wherein the suction cup includes an O-ring seal confined between two elements capable of being dismounted relative to one another.

* * * * *